United States Patent [19]
Foreman

[11] 3,859,621
[45] Jan. 7, 1975

[54] ACOUSTIC DIRECTION DETERMINATION SYSTEM

[75] Inventor: Donald S. Foreman, Fridley, Minn.

[73] Assignee: Honeywell Inc., Minneapolis, Minn.

[22] Filed: Nov. 2, 1973

[21] Appl. No.: 412,135

[52] U.S. Cl. ............ 340/6 R, 340/16 R, 343/113 R
[51] Int. Cl. ............................................. G01s 3/80
[58] Field of Search ................. 340/3 C, 6 R, 16 R; 343/113 R

[56] References Cited
UNITED STATES PATENTS
| | | | |
|---|---|---|---|
| 3,490,024 | 1/1970 | Sherrill et al. | 343/113 R |
| 3,605,096 | 9/1971 | Fothergill et al. | 343/113 R |
| 3,747,057 | 7/1973 | Brougher | 340/16 R |

*Primary Examiner*—Richard A. Farley
*Attorney, Agent, or Firm*—Molinare, Allegretti, Newitt & Witcoff

[57] ABSTRACT

The disclosure describes a digital acoustic direction determination system comprising a plurality of transducers each capable of producing electrical signals in response to an acoustic wave. Selection logic circuitry determines the octant or 45 degree arc segment from which the sound originates and transmits an octant digital number representing the octant to an adder. As soon as the wave strikes one of the transducers, a clock generator begins to step a shift register which has stored in it a predetermined bit pattern. The sum of the pulses shifted out of the shift register is proportional to the angle within the selected octant from which the sound originates. These pulses are summed in a counter. The contents of the counter are summed in the adder with the digital number representing the octant. The resultant sum is the exact bearing of the sound origin in degrees.

10 Claims, 8 Drawing Figures

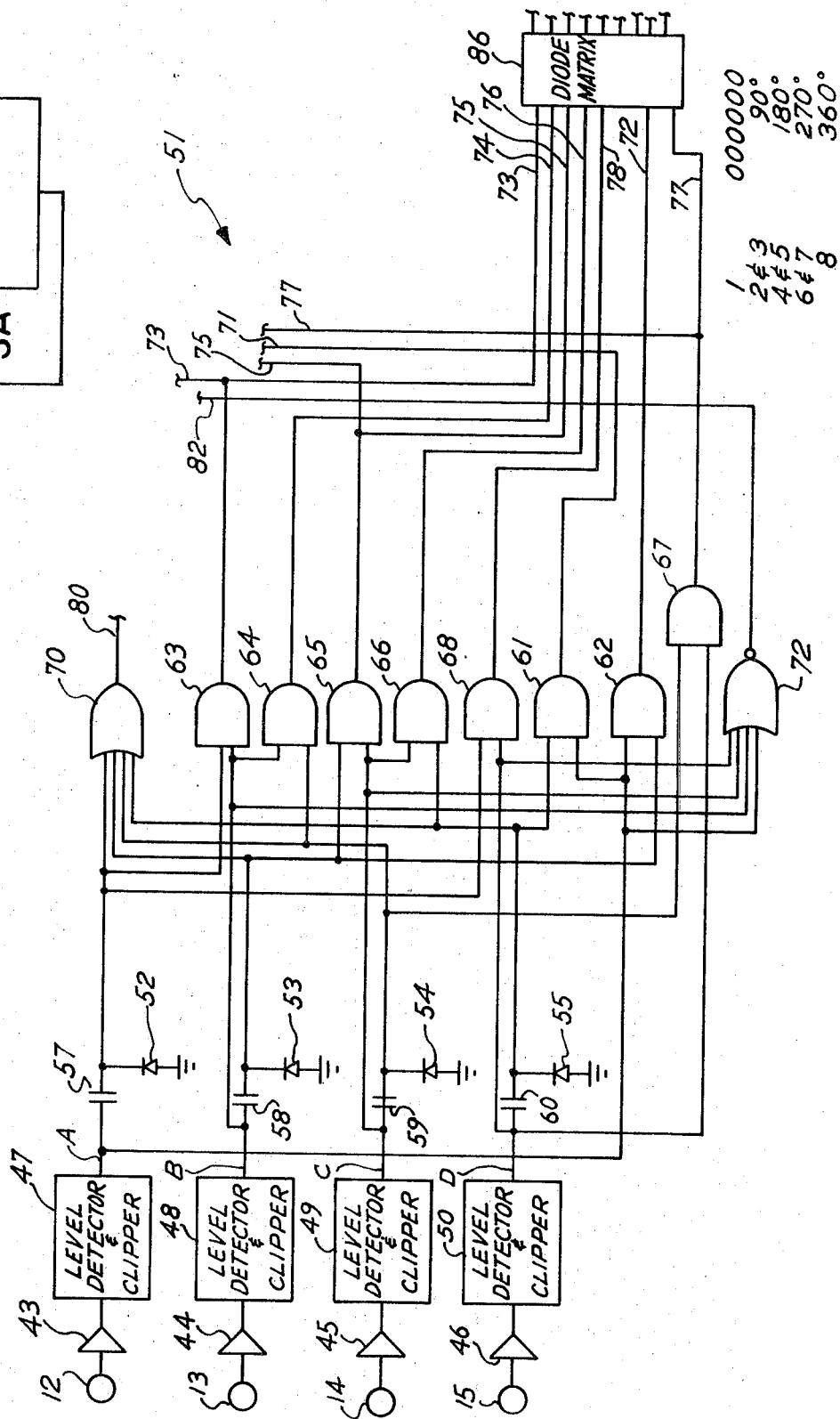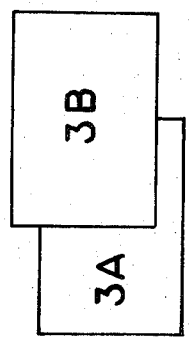

TO 9 BIT ADDER $$f = \frac{MC}{\frac{\sqrt{2}}{2}S}$$

ACOUSTIC DIRECTION DETERMINATION SYSTEM

BACKGROUND AND SUMMARY OF THE INVENTION

This invention relates to acoustic direction determination systems and more particularly relates to such systems in which the bearing of a sound source is indicated by a digital number.

A number of systems for determining acoustic direction have been devised in the past. Two such systems are shown in U.S. Pat. No. 3,160,850 (Dudley - Dec. 8, 1964) and U.S. Pat. No. 3,286,224 (Zefting - Nov. 15, 1966). Each of these patents describes analog circuitry which uses phase shifting techniques or techniques for balancing the signals received at acoustic transducers by physically moving the transducers. Although these techniques are suitable for some applications, it has been found that the direction from which a sound originates can be more accurately and inexpensively determined by the use of digital apparatus of the type described herein.

According to one feature of the invention, a plurality of transducers and associated selection circuitry determine the octant or 45 degree arc segment from which the sound is originating. At the same time, a clock pulse generator steps a memory, such as a shift register, which has been preloaded with information bits such that the sum of the pulses shifted out of the memory is proportional to the angle from which the sound originates. A counter counts the pulses shifted out of the memory. Gate circuitry limits the transmission of pulses to the period of time required for the acoustic wave to travel between two of the transducers. Digital computation circuitry then combines the number entered in the counter with a number corresponding to the octant determined by the selection circuitry in order to produce a digital number representing the bearing of the sound source in degrees.

According to another feature of the invention, four transducers are arranged at the corners of a geometric square, and the memory is loaded with data so that the sum of the pulses shifted out of the memory is proportional to $\sin^{-1}(N/\sqrt{2M})$ where $N$ equals the number of clock pulses received by the memory, and $M$ equals the number of bits of information stored in the memory.

According to still another feature of the invention, the clock generator comprises an amplifier having a feedback network arranged to produce electrical oscillations. The feedback network includes transducers which convert electrical signals to acoustic waves and vice versa. The transducers are displaced by a predetermined distance which automatically corrects for any change in the acoustic medium.

BRIEF DESCRIPTION OF THE DRAWINGS

These and other advantages and features of the present invention will hereafter appear in connection with the accompanying drawings wherein:

FIG. 3 illustrates the manner in which FIGS. 3A and 3B should be arranged;

FIGS. 3A and 3B are electrical schematic drawings showing a preferred form of the present invention;

DESCRIPTION OF THE PREFERRED EMBODIMENT

Figure 1:
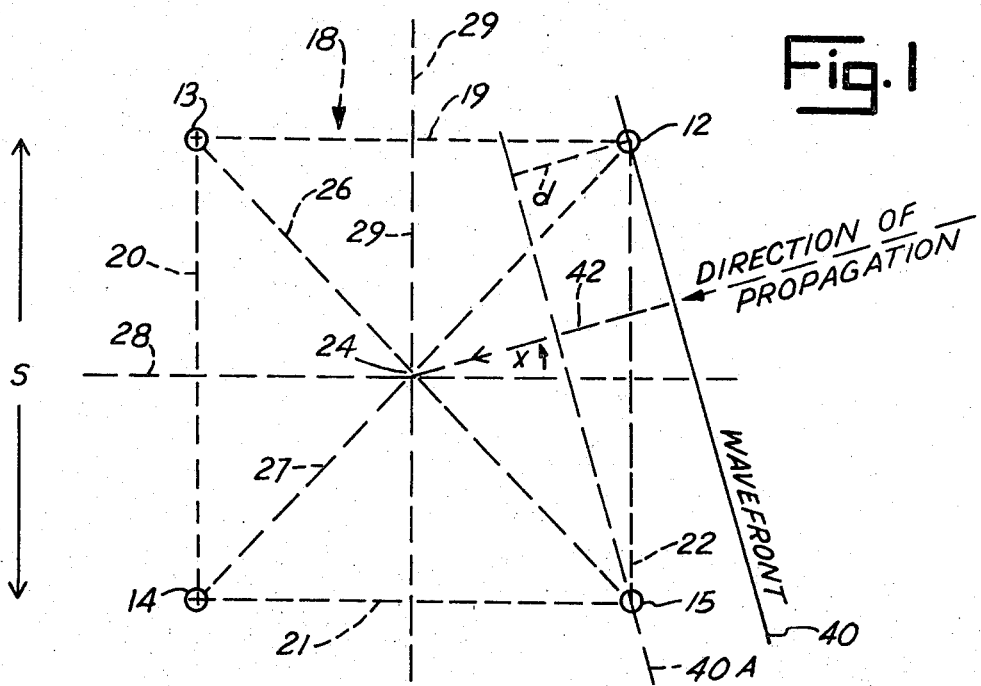
FIGS. 1 and 2 schematically illustrate a transducer assembly arranged according to the preferred practice of the invention.

Referring to the drawings, a preferred form of the present invention basically comprises a transducer assembly 10, selection circuitry 51, a clock generator 120, a read-only memory 126, gate circuitry 132, a 6-bit counter 148, and computation circuit 154.

Figure 2:
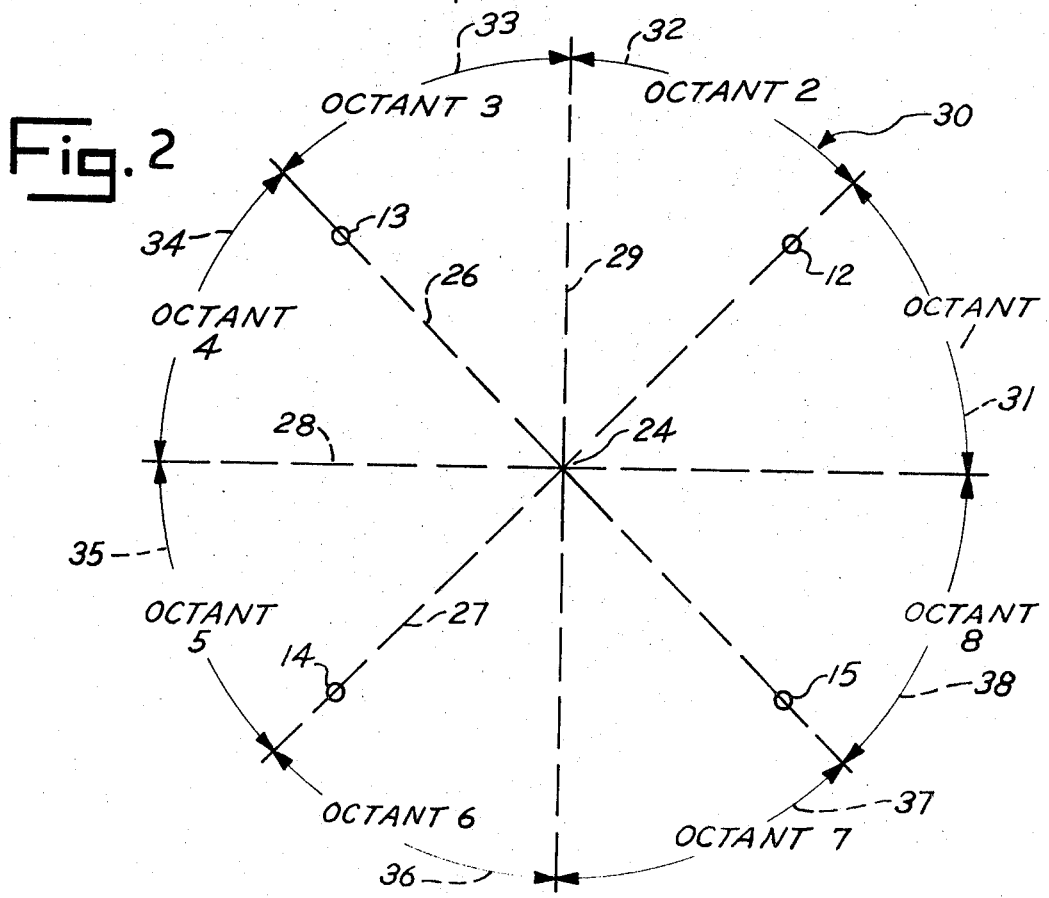

More specifically, referring to FIGS. 1 and 2, the transducer assembly comprises transducers 12-15, each of which is capable of generating an electric signal in response to an acoustic wave. One suitable transducer is an Astatic Microphone Model No. 333. The transducers are arranged in the corners of a square 18 comprising sides 19-22 having equal lengths S and a center point 24. The square is intersected by diagonal base lines 26, 27 and by perpendicular base lines 28, 29 in the manner shown in FIG. 1. Each of these base lines forms two radians which extend outward from center point 24.

Transducers 12-15 generate electrical signals responsive to an acoustic wavefront schematically illustrated by line 40 which travels in the direction of a bearing line 42. As shown in FIG. 1, bearing line 42 makes an angle X with respect to base line 28.

To avoid ambiguity, the largest dimension of square 18 must be less than a half wavelength of the soundwave being directionally measured at the highest frequency of interest. For example, if the highest frequency of interest is 1000 Hz, S should be no larger than 4.25 inches.

As shown in FIG. 2, a circle having point 24 as its center may be drawn to intersect the base lines to form arcuate segments 31-38 which form equal 45 degree octants 1-8 of the circle.

Referring to FIG. 3A, transducer assembly 10 also comprises preamplifiers 43-46 which provide amplification and low-pass filtering of the electrical signals generated by the transducers. Level detectors and clippers 47-50 reject all signals below a predetermined threshold amplitude and clip the remaining signals to form pulse signals of the type schematically shown in FIG. 6.

The additional components shown in FIG. 3A comprise selection circuitry 51. Circuitry 51 includes differentiating diodes 52-55 and differentiating capacitors 57-60. AND gates 61-68 produce positive output pulses when bearing line 42 lies in octants 1-8, respectively. OR gate 70 and NOR gate 72 are used to detect the presence of signals from the transducers in a manner described more fully later. Conductors 71-78, 80 and 82 connect the logic gates to other portions of the circuitry in the manner shown.

Figure 4:
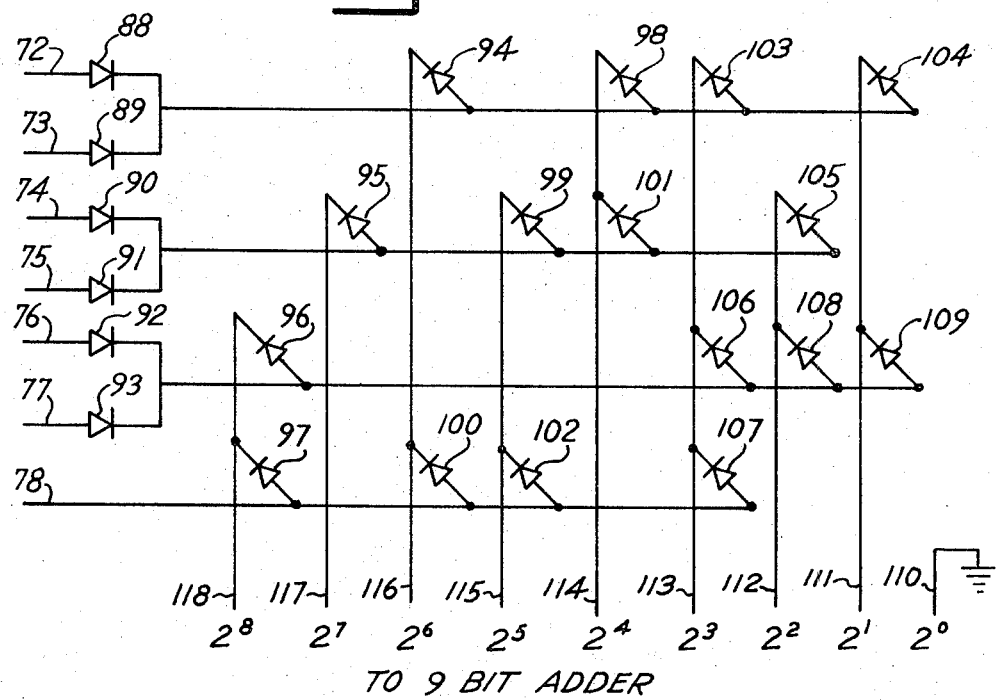
FIG. 4 is an electrical schematic drawing of a preferred form of a diode matrix made in accordance with the present invention.

A diode matrix 86 comprises a read-only memory which stores numbers corresponding to the angular position of the various base lines shown in FIGS. 1 and 2. As shown in FIG. 4, the matrix comprises diodes 88-109 and output conductors 110-118 which represent digital bits having weighted values from $2^0$–$2^8$, respectively.

Figure 3B:
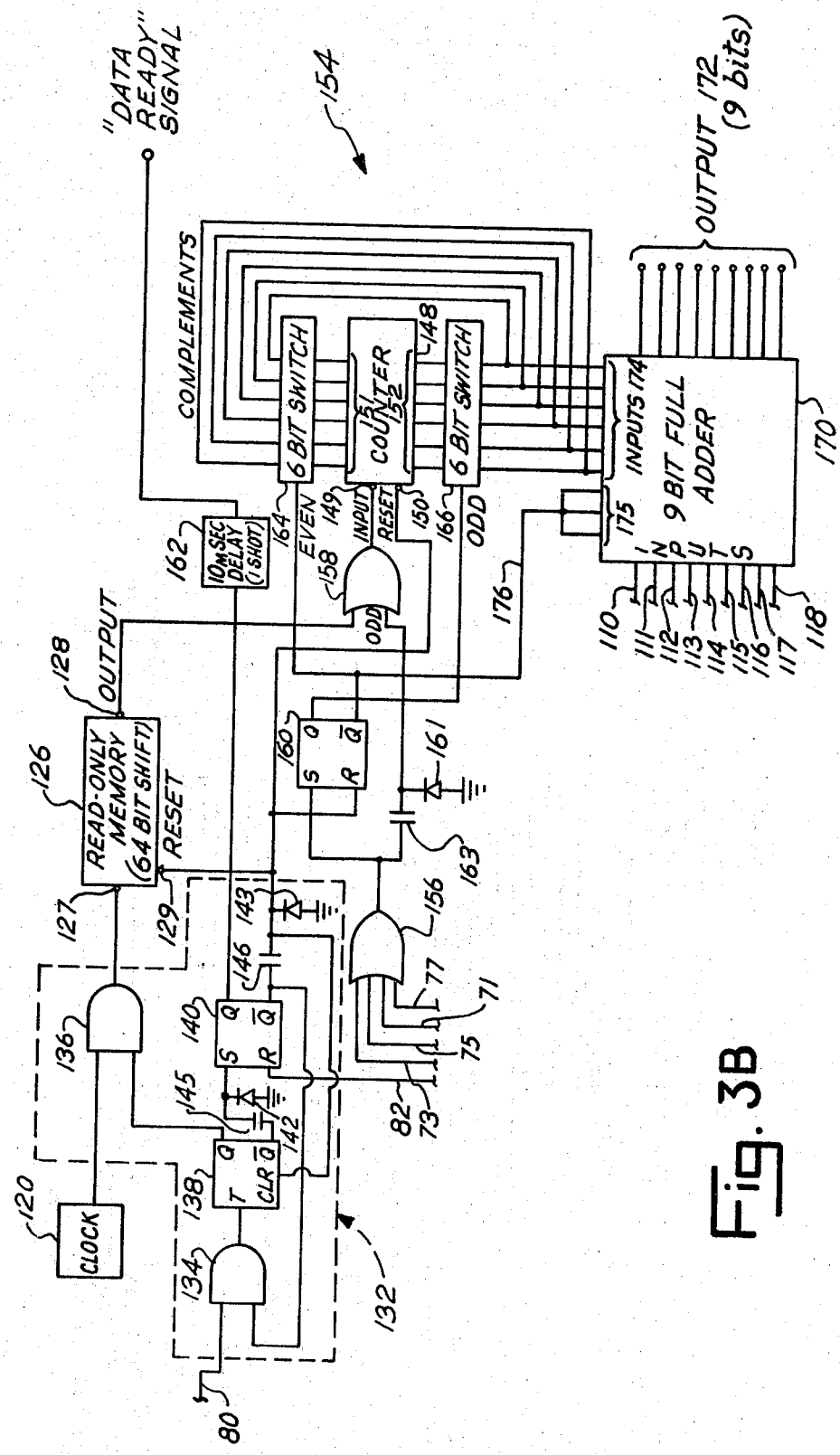
Figure 5:
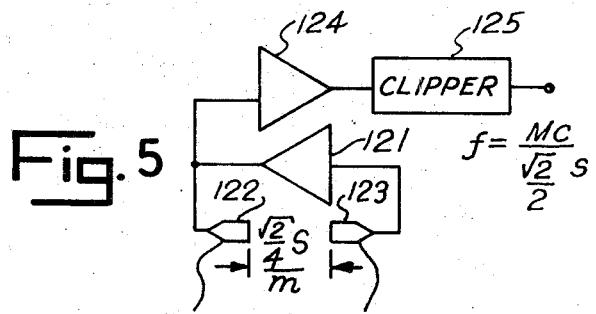
FIG. 5 is an electrical schematic drawing of a preferred form of clock generator made in accordance with the present invention.

Referring to FIGS. 3B and 5, clock generator 120 comprises an oscillator consisting of a conventional inverting amplifier 121 having a feedback network in which two identical piezoelectric transducers 122 and 123 are displaced by an air gap. Transducer 122 converts the electrical signals produced by amplifier 121 into corresponding acoustical waves, and transducer 123 converts the acoustical waves into corresponding electrical signals. The electrical signals produced by oscillating amplifier 121 are amplified by an amplifier 124 and converted to squarewave signals by a clipper 125 in a well known manner.

Clock generator 120 is designed to compensate for changes in the acoustical medium by means of transducers 122 and 123. The transducers should be displaced by an air gap having a width equal to: $S/2\sqrt{2M}$, where $S$ equals the dimension of one side of square 18 (FIG. 1) and $M$ equals the number of bits stored in memory 126. Under these conditions, the output frequency produced by the clock generator equals: $\sqrt{2MC/S}$, where $C$ equals the propagation velocity of wavefront 40. If the acoustical medium changes in any way, the feedback network of amplifier 121 changes in a similar manner so that the output frequency retains a constant relationship to the velocity of sound in the locality of the system. This is an important feature which increases the overall accuracy of the direction determination system.

Referring to FIG. 3B, read-only memory 126 comprises a 64-bit shift register having an input terminal 127, an output terminal 128, and a reset terminal 129. The contents of the read-only memory are such that the sum of its output pulses equals: $\sin^{-1}(N/\sqrt{2M})$ where $N$ is the number of times the memory has been stepped, and $M$ is the number of bits in the memory. The bit pattern stored in the memory is more fully described in the following Table A.

TABLE A

| COUNT | ARCSIN | DEGREES (OUTPUT) | ROM BIT PATTERN |
|---|---|---|---|
| 0 | 0.0000 | 0.0 | 1 |
| 1 | 0.6600 | 1.0 | 0 |
| 2 | 1.2900 | 1.0 | 1 |
| 3 | 1.9800 | 2.0 | 1 |
| 4 | 2.5800 | 3.0 | 0 |
| 5 | 3.2200 | 3.0 | 1 |
| 6 | 3.8699 | 4.0 | 1 |
| 7 | 4.5099 | 5.0 | 0 |
| 8 | 5.1599 | 5.0 | 1 |
| 9 | 5.7998 | 6.0 | 0 |
| 10 | 6.4498 | 6.0 | 1 |
| 11 | 7.0997 | 7.0 | 1 |
| 12 | 7.7497 | 8.0 | 0 |
| 13 | 8.3997 | 8.0 | 1 |
| 14 | 9.0495 | 9.0 | 1 |
| 15 | 9.6996 | 10.0 | 0 |
| 16 | 10.3495 | 10.0 | 1 |
| 17 | 11.0095 | 11.0 | 1 |
| 18 | 11.6595 | 12.0 | 0 |
| 19 | 12.3194 | 12.0 | 1 |
| 20 | 12.9794 | 13.0 | 1 |
| 21 | 13.6394 | 14.0 | 0 |
| 22 | 14.2993 | 14.0 | 1 |
| 23 | 14.9693 | 15.0 | 1 |
| 24 | 15.6292 | 16.0 | 0 |
| 25 | 16.2992 | 16.0 | 1 |
| 26 | 16.9692 | 17.0 | 1 |
| 27 | 17.6491 | 18.0 | 0 |
| 28 | 18.3191 | 18.0 | 1 |
| 29 | 18.9990 | 19.0 | 1 |
| 30 | 19.6790 | 20.0 | 0 |
| 31 | 20.3690 | 20.0 | 1 |
| 32 | 21.0589 | 21.0 | 1 |

TABLE A-Continued

| COUNT | ARCSIN | DEGREES (OUTPUT) | ROM BIT PATTERN |
|---|---|---|---|
| 33 | 21.7489 | 22.0 | 0 |
| 34 | 22.4388 | 22.0 | 1 |
| 35 | 23.1388 | 23.0 | 1 |
| 36 | 23.8387 | 24.0 | 1 |
| 37 | 24.5387 | 25.0 | 0 |
| 38 | 25.2487 | 25.0 | 1 |
| 39 | 25.9686 | 26.0 | 1 |
| 40 | 26.6786 | 27.0 | 0 |
| 41 | 27.4085 | 27.0 | 1 |
| 42 | 28.1285 | 28.0 | 1 |
| 43 | 28.8585 | 29.0 | 1 |
| 44 | 29.5984 | 30.0 | 0 |
| 45 | 30.3384 | 30.0 | 1 |
| 46 | 31.0883 | 31.0 | 1 |
| 47 | 31.8433 | 32.0 | 1 |
| 48 | 32.6082 | 33.0 | 0 |
| 49 | 33.3682 | 33.0 | 1 |
| 50 | 34.1481 | 34.0 | 1 |
| 51 | 34.9281 | 35.0 | 1 |
| 52 | 35.7080 | 36.0 | 1 |
| 53 | 36.5080 | 37.0 | 0 |
| 54 | 37.3080 | 37.0 | 1 |
| 55 | 38.1279 | 38.0 | 1 |
| 56 | 38.9479 | 39.0 | 1 |
| 57 | 39.7778 | 40.0 | 1 |
| 58 | 40.6178 | 41.0 | 0 |
| 59 | 41.4777 | 41.0 | 1 |
| 60 | 42.3377 | 42.0 | 1 |
| 61 | 43.2176 | 43.0 | 1 |
| 62 | 44.1075 | 44.0 | 1 |
| 63 | 45.0075 | 45.0 | 1 |

This is an important feature which enables the system to produce a digital number proportional to angle X.

Referring to FIG. 3B, gate circuit 132 comprises AND gates 134, 136, bistable flip-flop circuits 138, 140, diodes 142, 143 and capacitors 145, 146, all connected as shown. The gate circuit allows clock pulses to advance the read-only memory upon receipt of an acoustical wavefront at one of the transducers and prevents additional clock pulses from being transmitted to the read-only memory as soon as the wavefront strikes a second one of the transducers.

Figure 6:
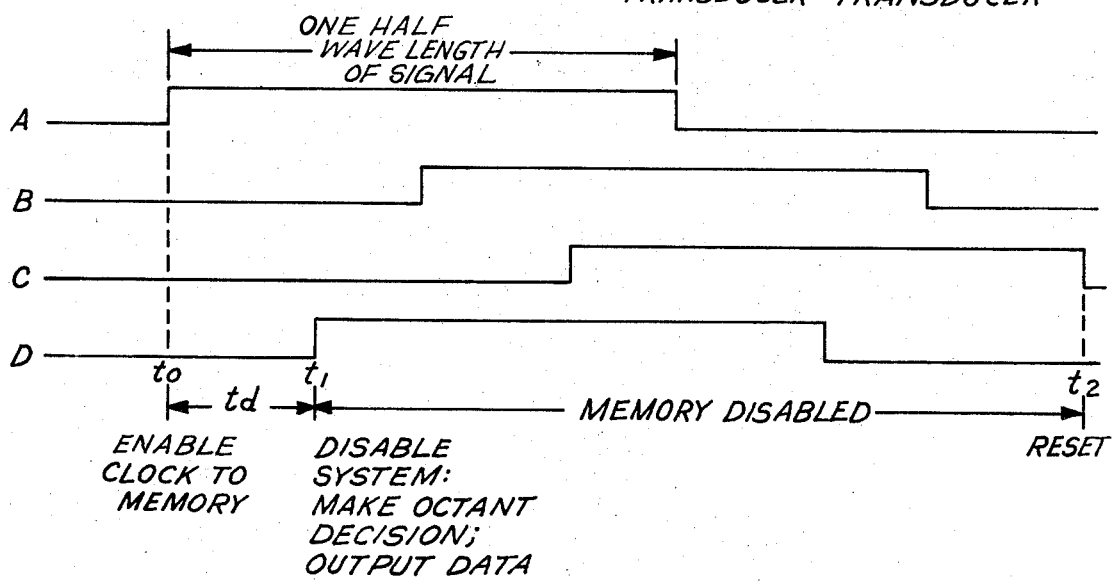
FIG. 6 illustrates voltage waveforms generated by the transducer assembly at the like-lettered points illustrated in FIG. 3A.

Still referring to FIG. 3B, 6-bit binary counter 148 comprises an input terminal 149, a reset terminal 150, "false" or complementary outputs 151 and "true" outputs 152.

The remaining components shown in FIG. 3B comprise computation circuit 154. More specifically, the circuit comprises OR gates 156, 158, a bistable flip-flop circuit 160, a diode 161 and a capacitor 163. A one-shot multivibrator 162 provides a "data ready" signal after a 10 microsecond delay. A 6-bit switch 164 is connected between the complementary outputs 151 of counter 148 and the least significant six inputs 174 of a 9-bit full adder 170. The most significant bits are controlled by flip-flop 160 and the state of conductor 176. Another 6-bit switch 166 is connected between the "true" outputs 152 of counter 148 and inputs 174 of adder 170. When counter 148 is reset, all of outputs 152 are switched to their 1 states. This is an important feature that enables numbers to be subtracted by adder 170 with a minimum of circuitry.

Adder 170 adds the 9-bit number on input conductors 110–118 to the 9-bit number on input conductors 174, 175 in order to produce a 9-bit number on output terminals 172 which reads directly in degrees. This number represents the bearing of bearing line 42 and the direction from which the wavefront 40 originated.

The system operates as follows. Direction finding is accomplished by determining the time of arrival of a given part of a soundwave at each of transducers 12–15. The portion of an acoustic wavefront that traverses the array of transducers is essentially planar, as represented by line 40 in FIG. 1, and the direction of propagation of the planar wavefront is normal to the plane of the wavefront, as schematically shown by bearing line 42 in FIG. 1. The propagation velocity of the wavefront is nearly constant, and any variations from the constant value are compensated for by the unique clock generator described above and shown in FIG. 5. As a result, the direction of propagation and the bearing of the source may be calculated by the unique circuitry described herein. Basically, selection circuitry 51 determines within which one of octants 1–8 the bearing of the sound source lies, and the remaining circuitry determines the precise angle of the bearing within the selected octant.

Referring to FIG. 3A, as an acoustic wavefront passes over each transducer, a squarewave pulse is produced by the corresponding amplifier, level detector and clipper. For example, if wavefront 40 passes over the transducers, signals of the type shown in FIG. 6 are generated at the correspondingly-lettered portions of the circuitry. Diodes 52–55 and capacitors 57–60 differentiate these pulses to form logic signals which operate AND gates 61–68. If the pulses are denoted by the letters A–D and the differentiated pulses are denoted by a prime (') (e.g., A'), selection circuitry 51 performs the following logic equations expressed in Boolean Algebra notation:

| LOGIC EQUATION | AND GATE SWITCHED TO ITS ONE STATE | CORRESPONDING OCTANT |
|---|---|---|
| A · D' | 61 | 1 |
| A · B' | 62 | 2 |
| B · A' | 63 | 3 |
| B · C' | 64 | 4 |
| C · B' | 65 | 5 |
| C · D' | 66 | 6 |
| D · C' | 67 | 7 |
| D · A' | 68 | 8 |

As soon as one of the foregoing logic equations is satisfied, the corresponding AND gate in the selection circuitry is switched to its 1 state so that the diode matrix 86 reads out a base line digital number to adder 170 corresponding to a base line adjacent the octant selected. The number produced by matrix 86 is shown in the following Table B:

TABLE B

| INPUT OCTANT | $2^8$ | $2^7$ | $2^6$ | $2^5$ | $2^4$ | $2^3$ | $2^2$ | $2^1$ | $2^0$ | DEGREES |
|---|---|---|---|---|---|---|---|---|---|---|
| 1 | 0 | 0 | 0 | 0 | 0 | 0 | 0 | 0 | 0 | : 0 |
| 2 | 0 | 0 | 1 | 0 | 1 | 1 | 0 | 1 | 0 | : 90 |
| 3 | 0 | 0 | 1 | 0 | 1 | 1 | 0 | 1 | 0 | : 90 |
| 4 | 0 | 1 | 0 | 1 | 1 | 0 | 1 | 0 | 0 | :180 |
| 5 | 0 | 1 | 0 | 1 | 1 | 0 | 1 | 0 | 0 | :180 |
| 6 | 1 | 0 | 0 | 0 | 0 | 1 | 1 | 1 | 0 | :270 |
| 7 | 1 | 0 | 0 | 0 | 0 | 1 | 1 | 1 | 0 | :270 |
| 8 | 1 | 0 | 1 | 1 | 0 | 1 | 0 | 0 | 0 | :360 |

For example, referring to FIGS. 1 and 3A, as soon as wavefront 40 strikes transducer 12 at time $t_0$, the output of level detector and clipper 47 is switched to its 1 state as shown by waveform A in FIG. 6. As soon as wavefront 40 strikes transducer 15 at time $t_1$, the output of level detector and clipper 50 is switched to its 1 state and is differentiated by diode 55 and capacitor 60. AND gate 61 is not connected to matrix 86 since the output conductors of the matrix are normally biased in their 0 states, which correctly indicates the number transmitted to the adder when bearing line 42 falls within octant 1. As a result, the matrix transmits the number 0 to adder 170. If bearing line 42 lies within the other octants, another digital number shown in Table B would be transmitted to adder 170 at time $t_1$.

In order to determine angle X of bearing line 42, the system measures the time required for the wavefront to travel between the first and second transducers struck by the wavefront. The relationship between elapsed time and propagation direction is illustrated by FIG. 1. As wavefront 40 enters the transducer array at angle X, it strikes transducer 12. The wavefront must then travel a distance $d=S \sin X$ before it strikes transducer 15. The time required for this to transpire is:

$$t_d = d/C = S \sin X/C \text{ for } X<45°$$

/S C is the acoustic propagation velocity of wavefront 40. Then $$\sin X = t_d/S\,C, \ X<45° \quad X=\sin^{-1} t_d/S\,C, \ X<45°$$

For X>45°, the wavefront will strike transducer 13 before transducer 15. In this case, the time used for computation will be the time elapsed between the striking of the transducers 12 and 13 by wavefront 40. This will yield an angle Y from base line 29 which is subtracted from 90°, the azimuth of base line 29, to obtain true bearing.

Time interval $t_d$ is used to obtain a correction digital number proportional to X by clock generator 120, memory 126, gate circuit 132 and counter 148. The clock generator steps memory 126 at fixed intervals. The contents of the read-only memory are such that the sum of its output pulses, as accumulated in the counter, is $\sin^{-1}(N/\sqrt{2M})$, where N is the number of times the memory has been stepped and M is the number of bits in the memory.

If
T = maximum counting time
C = propagation velocity of wavefront 40
S = length of one side of square 18
f = clock generator frequency
P = time between steps $=1/f$
t = elapsed time since time base was started
then $$T=S/\sqrt{2C} \quad P=T/M=S/\sqrt{2MC} \quad f=\sqrt{2MC}/S$$
$$N=ft=\sqrt{2MCt}/S$$

By substituting the expression for N into the expression for the sum of the counter output, the counter output becomes:

$\sin^{-1} tC/S = X$, which has been shown to be the target bearing relative to one of the base lines.

The bearing of line 42 is determined by adding to or subtracting from angle $X$ an angle associated with an appropriate base line. This process is described in the following Table C:

TABLE C

| OCTANT | PROCESS | BASE LINE NUMBER TRANSMITTED TO ADDER 170 BY MATRIX 86 |
|---|---|---|
| 1 | Output X | 0 |
| 2 | Subtract X from 90 | 90 |
| 3 | Add 90 to X | 90 |
| 4 | Subtract X from 180 | 180 |
| 5 | Add 180 to X | 180 |
| 6 | Subtract X from 270 | 270 |
| 7 | Add 270 to X | 270 |
| 8 | Subtract X from 360 | 360 |

The process by which the bearing of line 42 is obtained by the circuitry now will be discussed in more detail assuming that counter 148 is reset to −1. The transmission of clock pulses to memory 126 is controlled by gate circuit 132 (FIG. 3B). The Q outputs of flip-flops 138 and 140 are noramlly biased to their 0 states so that AND gate 136 normally blocks clock pulses from memory 126. As soon as wavefront 40 strikes transducer 12 (e.g., at time $t_o$ as shown in FIG. 6), the outputs of OR gate 70 and AND gate 134 are switched to their 1 states so that the Q output of flip-flop 138 is also switched to its 1 state, thereby enabling AND gate 136 to transmit clock pulses to memory 126. Clock pulses are transmitted to memory 126 until wavefront 40 strikes transducer 15 at time $t_1$ (FIG. 6). During the time interval between which wavefront 40 travels from transducer 12 to transducer 15 (i.e., time $t_d$), pulses are shifted out of memory 126 so that the sum of the pulses is proportional to angle X. At this time $t_1$, the outputs of OR gate 70 and AND gate 134 are again switched to their 1 states so that the Q output of flip-flop 138 is switched to its 0 state, thereby inhibiting AND gate 136 from transmitting additional clock pulses to memory 126. At $t_1$, flip-flop 140 is set so that its $\overline{Q}$ output is switched to its 0 state, thereby preventing AND gate 136 from gating additional clock pulses into memory 126 as wavefront 40 strikes transducers 13 and 14.

At time $t_1$, AND gate 61 and OR gate 156 are switched to their 1 states (OR gate 156 is switched to its 1 state if bearing line 42 lies in any odd-numbered octant.) The output of OR gate 156 is differentiated by diode 161 and capacitor 163 to add an extra count to counter 148 through OR gate 158. As a result, counter 148 (which was originally reset to −1) now reflects the true count of pulses shifted out of memory 126. As OR gate 156 is switched to its 1 state at time $t_1$, flip-flop 160 is set so that its Q output is switched to its 1 state, thereby switching switch 166 to its conductive state. As a result, the true outputs 152 of counter 148 are conducted to inputs 174 of adder 170. In addition, the $\overline{Q}$ output of flip-flop 160 is switched to its 0 state so that inputs 175 to adder 170 become 0's and switch 164 is disabled.

At time $t_1$, diode matrix 86 transmits a 0 output on conductors 110–118 to adder 170 so that the adder adds the correction number transmitted to inputs 174 and 175 to the base line number transmitted to inputs 110–118. The sum of these numbers is transmitted to output terminals 172.

At time $t_1$, plus 10 microseconds, one-shot multivibrator 162 transmits a "data ready" signal in response to the setting of flip-flop 140 so that the system can recognize the time at which relevant data is present on output terminals 172. The bearing represented by the digital number on output terminals 172 can be used to operate any conventional digital display device.

If bearing line 42 lies within an even-numbered octant, OR gate 156 is not switched to its 1 state and flip-flop 160 is not set so that switch 164 is enabled and switch 166 is disabled. In addition, there is no additional count transmitted to counter 148 through OR gate 158. As a result of this mode of operation, the complementary outputs 151 of counter 148 are transmitted to inputs 174 of adder 170 and inputs 175 are all switched to their 1 states. Adder 170 then subtracts the correction number present on inputs 174, 175 from the base line number present on inputs 110–118.

This novel mode of operation is achieved because counter 148 is reset to −1, that is, all of the outputs 152 are switched to their 1 states. If N represents the number in the counter and M represents the number transmitted to inputs 110–118, then the counter produces the complement of N−1 at outputs 151 which is the 1's complement of N. As a result, the sum of M and the complement of N−1 equals M−N. This is an important feature which enables the system to do subtraction with a minimum of circuitry.

After wavefront 40 has passed over all of the transducers, at time $t_2$ (FIG. 6), NOR gate 72 is switched to its 1 state so that flip-flop 140 is reset, thereby returning its $\overline{Q}$ output to its 1 state. In addition, memory 126 is reset and flip-flop 160 is reset so that its Q output is switched to its 0 state. After this mode of operation, the system is ready to respond to another acoustic wavefront.

Those skilled in the art will recognize that only a preferred embodiment of the invention has been described herein which may be altered and modified without departing from the true spirit and scope of the invention as defined in the appended claims.

What is claimed is:

1. A system for determining the direction in which an acoustic wave propagates through an acoustic medium comprising:

a plurality of transducers capable of producing electrical signals in response to the acoustic wave and arranged in a fixed pattern defining a closed curve having a center point through which a bearing line parallel to the direction of travel of the acoustic wave passes, the closed curve being divided by a predetermined number of radial base lines into arcuate segments, said plurality of transducers comprising a first transducer for producing a first electrical signal in response to the receipt of the acoustic wave at a first point in time and a second transducer for producing a second electrical signal in response to the receipt of the acoustic wave at a second point in time;

selection means for storing at least one base line digital number representing the angular position of each radial base line and responsive to the electrical signals from at least two of the transducers for transmitting a selected one of the base line digital numbers representing a selected one of the radial base lines adjacent the bearing line;

a clock pulse generator for generating clock pulses at a predetermined rate;

memory means responsive to the clock pulses for producing output pulses such that the sum of the pulses produced is proportional to the angle between the bearing line and the selected radial base line;

gate means for transmitting clock pulses to the memory means in response to the first electrical signal and for preventing clock pulses from being transmitted to the memory means in response to the second electrical signal;

counter means for counting and storing the output pulses from the memory means in the form of a correction digital number; and computation means for combining the correction digital number and the selected base line digital number to produce a bearing digital number representing the bearing of the bearing line in degrees.

2. A system, as claimed in claim 1, wherein the selection means comprises:

a read-only memory for storing the base line digital numbers; and logic means for determining which segment of the closed curve the bearing line intersects and for selecting one of the base line digital numbers representing one of the base lines defining said segment.

3. A system, as claimed in claim 2, wherein the read-only memory comprises a diode matrix.

4. A system, as claimed in claim 1, wherein the memory means comprises a shift register loaded with a predetermined bit pattern so that the sum of the bits shifted into the counter means in response to the clock pulses is proportional to the angle between the bearing line and the selected radial base line.

5. A system, as claimed in claim 1, wherein the plurality of transducers comprises four transducers, each transducer being located at a different corner of a square, and wherein the memory means comprises a read-only memory arranged so that the sum of the output pulses produced by the read-only memory is proportional to the $\sin^{-1} (N/ \sqrt{2M})$ where $N$ equals the number of clock pulses received by the read-only memory and $M$ equals the number of bits of information stored in the read-only memory.

6. A system, as claimed in claim 5, wherein the repetition rate of the clock pulses is proportional to $\sqrt{2} MC/S$ where $C$ equals the propagation velocity of the acoustic wave and $S$ equals the distance between two of the transducers along a side of the square.

7. A system, as claimed in claim 1, wherein the computation means comprises:

means for complementing the output of the counter means in response to predetermined conditions of the selection means to form the correction digital number; and an adder for adding the correction digital number and the selected base line digital number.

8. A system, as claimed in claim 1, wherein the clock pulse generator comprises:

an amplifier;

a feedback network connected to the amplifier so that the amplifier oscillates to produce electrical signals;

first transducer means connected in the feedback network and located in the acoustic medium for converting electrical signals to corresponding acoustic waves;

second transducer means connected in the feedback network for receiving the acoustic waves produced by the first transducer means and for converting the acoustic waves to corresponding electrical signals, said first and second transducer means being displaced in the acoustic medium by a predetermined distance.

9. A system, as claimed in claim 8, wherein the plurality of transducers comprises four transducers, each transducer being located at a different corner of a square, wherein the memory means comprises a read-only memory arranged so that the sum of the output pulses produced by the read-only memory is proportional to the $\sin^{-1} (N/ \sqrt{2M})$ where $N$ equals the number of clock pulses received by the read-only memory and $M$ equals the number of bits of information stored in the read-only memory, and wherein the predetermined distance is proportional to $S/2 \sqrt{2M}$ where $S$ equals the dimension of one side of the square.

10. A system, as claimed in claim 1, wherein the counter means comprises a first set of outputs capable of representing a first digital number and a second set of outputs capable of representing the complement of said first digital number and wherein the computation means comprises:

an adder including a first set of intpus and a second set of inputs adapted to receive digital signals representing digital numbers;

means for resetting the counter means to represent $-1$;

means for transmitting signals representing a second digital number to the second set of inputs; and means for operatively connecting the second set of outputs to the first set of inputs, whereby the adder subtracts the first digital number from the second digital number.

* * * * *

UNITED STATES PATENT OFFICE
CERTIFICATE OF CORRECTION

PATENT NO. : 3,859,621
DATED : January 7, 1975
INVENTOR(S) : DONALD S. FOREMAN

It is certified that error appears in the above-identified patent and that said Letters Patent are hereby corrected as shown below:

Column 1, line 44, cancel "$(N/\overline{\sqrt{2M}})$" and substitute --$(N/\sqrt{2M})$--.

Column 3, line 19, cancel "$S/2\overline{\sqrt{2M}}$" and substitute --$S/2\sqrt{2M}$--;

line 23, cancel "$\overline{\sqrt{2MC/S}}$" and substitute --$\sqrt{2MC}/S$--;

line 35, cancel "$(N/\sqrt{2M})$" and substitute --$(N/\sqrt{2M})$--.

Column 6, line 41, cancel "$(N/\sqrt{2M})$" and substitute --$(N/\sqrt{2M})$--;

line 52, cancel "$T=S/\sqrt{2C}$" and substitute --$T=S/\sqrt{2C}$--.

UNITED STATES PATENT OFFICE
CERTIFICATE OF CORRECTION

Patent No. 3,859,621  Dated January 7, 1975

Inventor(s) Donald S. Foreman  Page - 2

It is certified that error appears in the above-identified patent and that said Letters Patent are hereby corrected as shown below:

Claim 5, line 7, cancel "$(N/\overline{\sqrt{2M}})$" and substitute --$(N/\sqrt{2M})$--.

Claim 9, line 7, cancel "$(N/\overline{\sqrt{2M}})$" and substitute --$(N/\sqrt{2M})$--;

line 11, cancel "$S/2\overline{\sqrt{2M}}$" and substitute --$S/2\sqrt{2M}$--.

Signed and Sealed this twenty-third Day of September 1975

[SEAL]

Attest:

RUTH C. MASON  
Attesting Officer

C. MARSHALL DANN  
Commissioner of Patents and Trademarks